(12) United States Patent
Ueno et al.

(10) Patent No.: US 8,724,748 B2
(45) Date of Patent: May 13, 2014

(54) WIRELESS COMMUNICATION TERMINAL

(75) Inventors: Mayuko Ueno, Chiba (JP); Syuji Kubota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 126 days.

(21) Appl. No.: 13/319,818

(22) PCT Filed: May 7, 2010

(86) PCT No.: PCT/JP2010/058145
§ 371 (c)(1),
(2), (4) Date: Dec. 8, 2011

(87) PCT Pub. No.: WO2010/131726
PCT Pub. Date: Nov. 18, 2010

(65) Prior Publication Data
US 2012/0121044 A1   May 17, 2012

(30) Foreign Application Priority Data

May 11, 2009   (JP) ................................ 2009-114433

(51) Int. Cl.
*H04L 27/06* (2006.01)

(52) U.S. Cl.
USPC ........... 375/340; 375/343; 375/349; 375/347; 455/132; 455/133; 455/134; 455/135

(58) Field of Classification Search
USPC ........... 375/340, 343, 349, 347; 455/132–135
See application file for complete search history.

(56) References Cited

U.S. PATENT DOCUMENTS

| | | | |
|---|---|---|---|
| 7,221,963 B2 * | 5/2007 | Ishihara et al. | 455/562.1 |
| 7,356,316 B2 * | 4/2008 | Ogiso et al. | 455/127.5 |
| 8,243,778 B1 * | 8/2012 | Feng et al. | 375/150 |
| 2003/0063607 A1 | 4/2003 | Adachi et al. | |
| 2005/0195795 A1 * | 9/2005 | Aoki et al. | 370/351 |
| 2005/0272384 A1 | 12/2005 | Kogure | |
| 2006/0270427 A1 | 11/2006 | Shida et al. | |
| 2008/0095095 A1 | 4/2008 | Adachi et al. | |
| 2009/0147838 A1 | 6/2009 | Shida et al. | |

FOREIGN PATENT DOCUMENTS

| | | |
|---|---|---|
| JP | 04-010724 A | 1/1992 |
| JP | 2000 174726 | 6/2000 |
| JP | 2000-174726 A | 6/2000 |
| JP | 2003 174452 | 6/2003 |

(Continued)

OTHER PUBLICATIONS

International Search Report Issued Jul. 6, 2010 in PCT/JP10/058145 Filed May 7, 2010.

(Continued)

*Primary Examiner* — Daniel Washburn
*Assistant Examiner* — Rahel Guarino
(74) *Attorney, Agent, or Firm* — Oblon, Spivak, McClelland, Maier & Neustadt, L.L.P.

(57) ABSTRACT

A wireless communication terminal includes an antenna selecting unit that selects, for each packet, an antenna for use in receiving signals from among a plurality of a plurality of antennas; a packet-destination judging unit that judges whether a packet obtained by demodulating a signal received by the receiving antenna selected by the antenna selecting unit is destined for the wireless communication terminal; and a stand-by-antenna determining unit that determines a stand-by antenna for use in receiving a packet to be received next based on a result of selection made by the antenna selecting unit and a result of judgment made by the packet-destination judging unit.

6 Claims, 7 Drawing Sheets

(56) References Cited

FOREIGN PATENT DOCUMENTS

| JP | 2005 252825 | | 9/2005 |
| JP | 2005 268959 | | 9/2005 |
| JP | 2005-268959 A | * | 9/2005 |
| JP | 2005 348137 | | 12/2005 |
| JP | 2006 333283 | | 12/2006 |
| JP | 2007 143090 | | 6/2007 |

OTHER PUBLICATIONS

Office Action issued Mar. 19, 2013, in Japanese Patent Application No. 2009-114433.

Office Action issued Jun. 18, 2013 in Japanese Patent Application No. 2009-114433.

* cited by examiner

WIRELESS COMMUNICATION TERMINAL

TECHNICAL FIELD

The present invention is directed generally to wireless communication terminals. More particularly, the invention is directed to a wireless communication terminal that carries out communications by using a plurality of antennas on a packet-by-packet basis with a diversity technique.

BACKGROUND ART

Convenience provided by their mobility has brought wireless communication terminals that can be used in wireless LAN (local area network) and the like into wide use not only in enterprises but also in home consumer market rapidly in recent years.

Among standards for wireless LAN, a DSSS (direct sequence spread spectrum) method is defined in IEEE 802.11b; an OFDM (orthogonal frequency division multiplexing) method is defined in IEEE 802.11a; and a method for supporting both DSSS and OFDM is defined in IEEE 802.11g. At present, products that conform to the IEEE 802.11n draft standard that aims at further increase in throughput are becoming common.

In recent years, more and more various mobile terminals, such as notebook PCs (personal computers) and cellular phones, incorporate wireless LAN functionality. Many of such products available on the market include two or more antennas and employ what is called a selection diversity technique of carrying out communications by using an antenna that has a stronger received signal power. Application of this selection diversity technique is not limited to wireless LAN, and this technique is broadly used in the field of mobile wireless communication, such as cellular phone systems.

With the selection diversity technique in the field of mobile wireless communication, an antenna that has received a received signal with strongest signal power among a plurality of antennas is selected and used in signal receiving. In wireless LAN, two antennas are used, and received power of a preamble signal of each of the two antennas is measured for each packet. An antenna for use in receiving the packet is selected based on a result of the measurement.

FIG. 6 illustrates access points 100 and 200 (hereinafter, simply referred to as "AP 100" and "AP 200"), which are wireless LAN access points in infrastructure mode, a wireless communication terminal 50 that is currently communicating with the AP 100, and a wireless communication terminal 51 that is currently communicating with the AP 200.

A range where radio waves originated from an antenna of the AP 100 is indicated by a dotted line in FIG. 6. As is illustrated, the wireless communication terminal 50 is capable of receiving a packet transmitted from the AP 100 by using an antenna 60 but unable to receive the same by using an antenna 61.

When the wireless communication terminal 50 continues to receive packets by using the antenna 60, the wireless communication terminal 50 can successfully detect and receive packets originated from the AP 100; however, if the wireless communication terminal 50 uses the antenna 61 in packet receiving, the wireless communication terminal 50 cannot detect a packet originated from the AP 100 and hence fails to receive the packet. In other words, in the vicinity of a boundary of the communication range where radio waves originated from the AP 100 can reach, in some cases the wireless communication terminal successfully detects a packet but in other cases the wireless communication terminal fails to detect the same depending on an antenna that has been selected as a stand-by antenna while waiting for receiving a signal.

For instance, assume that the wireless communication terminal 50 is to select a stand-by antenna for use in receiving a packet to be received next while receiving a packet. Further assume that, selecting the antenna 60 for the AP 100 results in stronger received power than that by using the antenna 61; in contrast, selecting the antenna 61 for the wireless communication terminal 51 and for the AP 200 results in stronger received power than that by using the antenna 60 as illustrated in FIG. 6. It is assumed that under such a condition, the APs 1 and 2 and the wireless communication terminals 50 and 51 included in the wireless LAN transmit packets as illustrated in FIG. 7.

Referring to FIG. 7, the AP 100 transmits a DATA packet to the wireless communication terminal 50 first, and the wireless communication terminal 50 transmits to the AP 100 an ACK packet that acknowledges successful receipt of the DATA packet transmitted from the AP 100. Thereafter, transmission of a DATA packet from the wireless communication terminal 51, transmission of an ACK packet from the AP 200, and transmission of a DATA packet from the AP 100 are performed.

Upon unintentionally receiving an ACK packet transmitted from the AP 200, the wireless communication terminal 50 selects the antenna 61 based on a result of judgment that, because receiving power received by the antenna 61 is stronger than that received by the antenna 60, the antenna 61 is an optimum receiving antenna, causing the antenna 61 to remain to be selected as the stand-by antenna.

Accordingly, the wireless communication terminal 50 cannot detect a DATA packet to be transmitted next from the AP 100 and hence fails to receive the DATA packet. Thus, with such conventional technique as discussed above, there can be cases where an optimum stand-by antenna cannot be selected depending on a communication condition of other AP and/or wireless communication terminal.

To circumvent such a situation, techniques of causing, by software control, a wireless communication terminal to select an optimum stand-by antenna by sequentially switching antennas during a packet waiting time with a relatively small circuit size have been devised (see, for instance, Japanese Patent Application Laid-open No. 2005-252825).

Other techniques of causing a wireless communication terminal to select a stand-by antenna while receiving a packet, of which source address is a currently-communicating AP and of which destination address is not that of the wireless communication terminal, to thereby select an optimum stand-by antenna have been devised (see, for instance, Japanese Patent Application Laid-open No. 2007-143090).

However, APs and wireless communications terminals are provided close to one another in recent wireless LAN environment, causing radio waves to be crowded with one another in some cases, resulting in considerably short packet waiting time. In such a case, because the conventional wireless communication terminal described in Japanese Patent Application Laid-open No. 2005-252825 selects a stand-by antenna with software that is not suitable for high-speed processing, there can be some cases where operation of selecting a stand-by antenna lags behind high-speed processing. Put another way, the conventional wireless communication terminal described in Japanese Patent Application Laid-open No. 2005-252825 is disadvantageous in being influenced by a communication condition of another wireless communication terminal when selecting a stand-by antenna.

The conventional wireless communication terminal described in Japanese Patent Application Laid-open No.

2007-143090 is allowed to select an optimum stand-by antenna only when an AP, with which the wireless communication terminal is communicating, is communicating with another wireless communication terminal and the other wireless communication terminal is transmitting/receiving a packet. Put another way, the conventional wireless communication terminal described in Japanese Patent Application Laid-open No. 2007-143090 is disadvantageous in that the wireless communication terminal can be influenced by communication condition of another wireless communication terminal when selecting a stand-by antenna.

The wireless communication terminal described in Japanese Patent Application Laid-open No. 2007-143090 is also disadvantageous in that because the wireless communication terminal performs signal processing, such as receiving, also in a period during which a packet, of which destination address is not that of the wireless communication terminal, is transmitted, electric power is consumed in performing signal processing for such a packet.

The present invention has been conceived in view of the above circumstances and aims at providing a wireless communication terminal that is capable of selecting an optimum stand-by antenna with lower electric power consumption than that of conventional wireless communication terminals and less influenced by a communication condition of another wireless communication terminal.

DISCLOSURE OF INVENTION

According to an aspect of the present invention, there is provided a wireless communication terminal that carries out communications on a packet-by-packet basis by using a plurality of antennas with a diversity technique. The wireless communication terminal includes an antenna selecting unit that selects, for each packet, an antenna for use in receiving signals from among the plurality of antennas; a packet-destination judging unit that judges whether a packet obtained by demodulating a signal received by the antenna selected by the antenna selecting unit is destined for the wireless communication terminal; and a stand-by-antenna determining unit that determines a stand-by antenna for use in receiving a packet to be received next based on a result of selection made by the antenna selecting unit and a result of judgment made by the packet-destination judging unit.

With this configuration, a wireless communication terminal determines whether an antenna, which is for use in receiving signals, selected by an antenna selecting unit is to be set as a stand-by antenna based on whether a packet obtained by demodulating a signal received via the antenna selected by the antenna selecting unit is destined for the wireless communication terminal. Accordingly, the wireless communication terminal can select an optimum stand-by antenna with lower electric power consumption than that of conventional wireless communication terminals and less influenced by a communication condition of another wireless communication terminal.

The wireless communication terminal may be configured such that, when the packet-destination judging unit has judged that the packet obtained by demodulating the signal received by the antenna selected by the antenna selecting unit is destined for the wireless communication terminal, the stand-by-antenna determining unit sets the antenna selected by the antenna selecting unit as the stand-by antenna, and when the packet-destination judging unit has judged that the packet is not destined for the wireless communication terminal, the stand-by-antenna determining unit does not perform stand-by antenna switching.

With this configuration, the wireless communication terminal does not change the stand-by antenna if the antenna for use in receiving signals has been changed by the antenna selecting unit based on the packet transmitted from and received by another wireless communication terminal. Accordingly, the wireless communication terminal is allowed to make stand-by antenna selection without being influenced by a communication condition of the other wireless communication terminal.

The packet-destination judging unit may judge whether the packet obtained by demodulating the signal received by the receiving antenna selected by the antenna selecting unit is destined for the wireless communication terminal based on whether a destination address contained in a MAC header of the packet matches an address of the wireless communication terminal.

With this configuration, the wireless communication terminal can judge whether the packet obtained by demodulating the signal received via the receiving antenna selected by the antenna selecting unit is destined for the wireless communication terminal by referring to a destination address of the packet.

The packet-destination judging unit may judge whether the packet obtained by demodulating the signal received by the receiving antenna selected by the antenna selecting unit is destined for the wireless communication terminal based on whether the packet is transmitted from the wireless communication terminal within a set period of time after the signal has been demodulated into the packet.

In the IEEE 802.11a standard, it is defined that if a station has received a packet destined for the station, the station is to transmit a packet, what is called ACK, that acknowledges successful receipt of the packet after a lapse of a short period of time (10 μsec or 16 μsec), what is called SIFS (short inter frame space). Such protocol analysis of a MAC header or the like as discussed above is performed in its upper layer in many cases.

Accordingly, the wireless communication terminal can judge whether the packet obtained by demodulating the signal received by the antenna selected by the antenna selecting unit is destined for the wireless communication terminal based on whether transmission from the wireless communication terminal is performed within a set period of time, which corresponds to SIFS having a certain margin to take delays due to standards and processing time into account, after the signal has been demodulated.

The stand-by-antenna determining unit may make the determination as to whether the packet obtained by demodulating the signal received by the antenna selected by the antenna selecting unit is destined for the wireless communication terminal when communications are carried out in infrastructure mode where wireless communications are carried out between wireless communication terminals via an access point.

With this configuration, when communication mode is infrastructure mode, the wireless communication terminal can select an optimum stand-by antenna less influenced by communication condition of another wireless terminal than conventional wireless communication terminals are.

Even when the communications are carried out in ad-hoc mode where wireless communications are carried out directly between wireless communication terminals, if the wireless communication terminal is communicating with a single wireless communication terminal, the stand-by-antenna determining unit may make the determination as to whether the packet obtained by demodulating the signal received by the antenna selected by the antenna selecting unit is destined for the wireless communication terminal.

With this configuration, even when communication mode is ad-hoc mode, if the wireless communication terminal is communicating with a single wireless communication terminal, the wireless communication terminal can select an optimum stand-by antenna less influenced by communication condition of another wireless terminal than conventional wireless communication terminals are.

Hence, according to embodiments of the present invention, a wireless communication terminal that can select an optimum stand-by antenna with lower electric power consumption than that of conventional wireless communication terminals and less influenced by a communication condition of another wireless communication terminal is provided, which is advantageous.

BEST MODE(S) FOR CARRYING OUT THE INVENTION

Embodiments of the present invention will be described below with reference to the drawings.

First Embodiment

Figure 1:
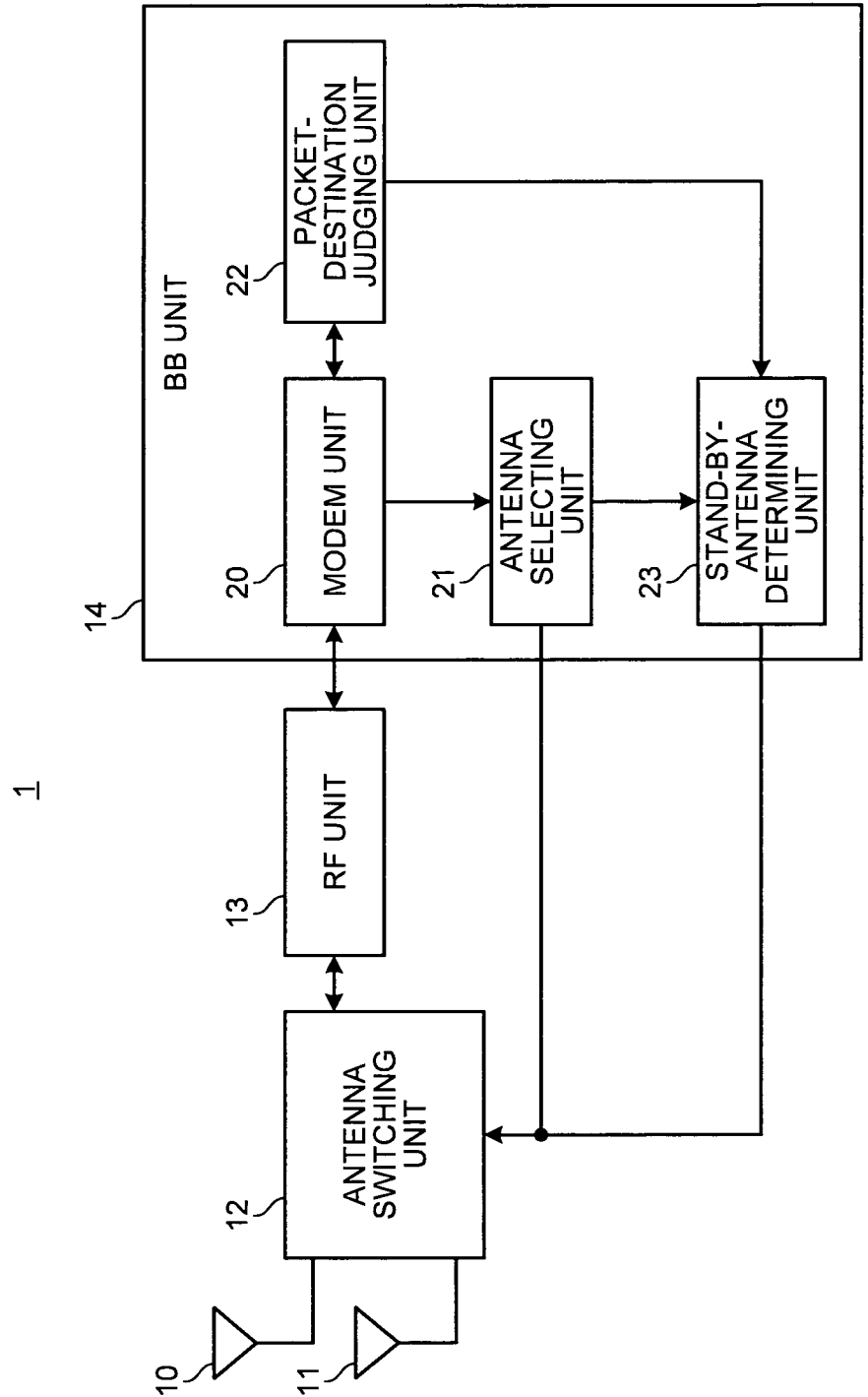
FIG. 1 is a block diagram of a wireless communication terminal according to a first embodiment of the present invention.

As illustrated in FIG. 1, a wireless communication terminal 1 according to a first embodiment of the present invention includes an antenna 10, an antenna 11, an antenna switching unit 12 that performs switching between the antennas 10 and 11, an RF (radio frequency) unit 13 that transmits and receives RF signals via the antenna 10, 11, and a BB (baseband) unit 14 that processes a BB signal.

Note that only elements involved in determination of a stand-by antenna for use in receiving a packet to be received next are illustrated in FIG. 1 and other elements related to reception, transmission, and other functions are omitted. Although two antennas, or specifically the antennas 10 and 11, are illustrated in FIG. 1, it is not intended by FIG. 1 to limit the number of the antennas provided in the wireless communication terminal.

The RF unit 13 is configured to down-convert an RF signal received via the antenna 10, 11 into a BB signal and feed the thus-down-converted BB signal to the BB unit 14. The RF unit 13 is also configured to up-convert a BB signal fed from the BB unit 14 into an RF signal and transmit the thus-up-converted RF signal via the antenna 10, 11.

The BB unit 14 includes a modulator-demodulator (modem) unit 20 that performs modulation and demodulation of a packet, an antenna selecting unit 21 that selects an optimum receiving antenna for each packet during a preamble duration, a packet-destination judging unit 22 that judges whether a packet obtained by demodulating a signal received by a receiving antenna selected by the antenna selecting unit 21 is destined for the wireless communication terminal 1, and a stand-by-antenna determining unit 23 that determines a stand-by antenna based on a result of selection made by the antenna selecting unit 21 and a result of judgment made by the packet-destination judging unit 22.

The antenna selecting unit 21, the packet-destination judging unit 22, and the stand-by-antenna determining unit 23 are implemented on logical circuit included on an LSI (large scale integration) or the like. The antenna selecting unit 21, the packet-destination judging unit 22, and the stand-by-antenna determining unit 23 can be provided, as illustrated in FIG. 1, in the BB unit 14 or in a portion that processes an upper layer, such as a protocol layer.

The antenna selecting unit 21 is configured to measure received power of a signal received via the antenna 10, 11 by, for instance, measuring RSSI (received signal strength indicator).

The antenna selecting unit 21 is also configured to cause, when a packet has been demodulated by the modem unit 20, the antenna switching unit 12 to switch a receiving antenna from one to another sequentially during a preamble duration of the packet, to thereby select an antenna that has received a highest RSSI signal as an optimum receiving antenna.

The packet-destination judging unit 22 is configured to judge whether each packet is destined for the wireless communication terminal 1 based on whether a destination address contained in a MAC (media access control) header of a packet obtained by demodulating a signal received via a receiving antenna selected by the antenna selecting unit 21 matches an address of the wireless communication terminal 1.

Figure 2:
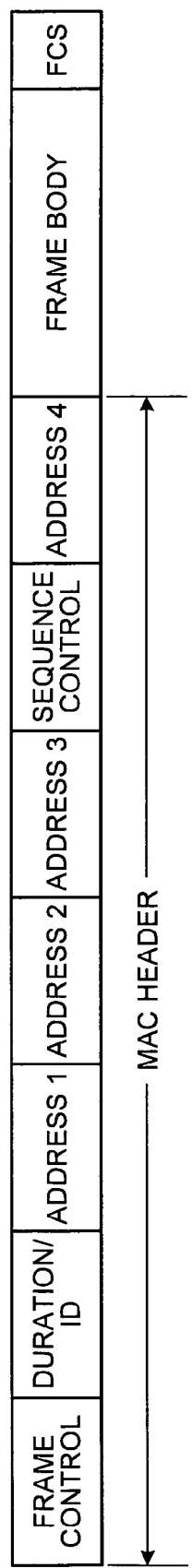
FIG. 2 is a schematic view illustrating a basic MAC frame format defined in IEEE 802.11.

FIG. 2 illustrates a basic MAC frame format defined in IEEE 802.11. The MAC frame illustrated in FIG. 2 includes a MAC header, data (Frame Body), and a sequence (FCS (frame check sequence)) for use in checking data integrity.

The MAC header includes a frame control (Frame Control) field that defines a version of a protocol, and the like, a duration (Duration/ID) field that indicates a duration for which wireless channel is to be used, address (Address 1, Address 2, Address 3, Address 4) fields that vary depending on communication mode and whether a transmitting station is an access point or a terminal, and a sequence control (Sequence Control) field.

When communication mode is infrastructure mode and the transmitting station is an access point, Address 1 is used to indicate a destination MAC address, Address 2 is used to indicate BSSID (basic service set identifier) that indicates a MAC address of the access point, Address 3 is used indicate a source MAC address, and Address 4 is not used.

When communication mode is ad-hoc mode, Address 1 is used to indicate a destination MAC address, Address 2 is used to indicate a source MAC address, Address 3 is used to indicate BSSID, which is an arbitrary value, and Address 4 is not used.

When communication mode is infrastructure mode and the transmitting station is an access point, or when communication mode is ad-hoc mode, in the example illustrated in FIG. 2, the packet-destination judging unit 22 judges whether each packet is destined for the wireless communication terminal 1 based on whether the destination MAC address (Address 1) contained in the MAC header of the MAC frame matches a MAC address of the wireless communication terminal 1.

Referring to FIG. 1, the stand-by-antenna determining unit 23 is configured such that, if the packet-destination judging unit 22 has judged a packet obtained by demodulating a signal received via a receiving antenna selected by the antenna selecting unit 21 as being destined for the wireless communication terminal 1, the stand-by-antenna determining unit 23 sets the receiving antenna selected by the antenna selecting unit 21 as a stand-by antenna, and if the packet is not judged as being destined for the wireless communication terminal 1, the stand-by-antenna determining unit 23 does not perform stand-by antenna switching. Put another way, the stand-by-antenna determining unit 23 sets the antenna, which has been set as a stand-by antenna when the packet has been received, as the stand-by antenna for use in receiving a packet to be received next.

Figure 3:
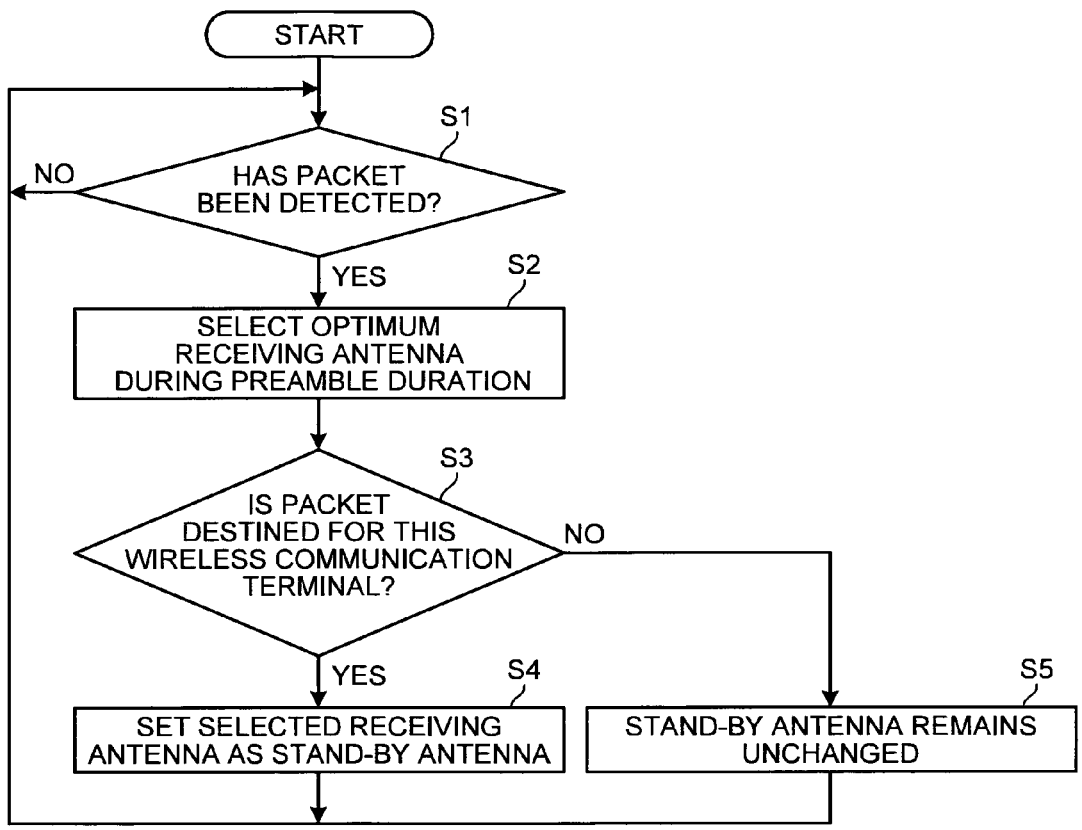
FIG. 3 is a flowchart for explaining how the wireless communication terminal according to the first embodiment operates when receiving a packet.

How the wireless communication terminal 1 configured as discussed above operates when receiving a packet will be described with reference to FIG. 3.

When the antenna selecting unit 21 detects a packet that has been received by a stand-by antenna and demodulated by the modem unit 20 (Step S1), the antenna selecting unit 21 selects an antenna that has received a highest RSSI signal during a preamble duration of this packet as an optimum receiving antenna (Step S2).

While the packet is being received, the packet-destination judging unit 22 judges whether the packet is destined for the wireless communication terminal 1 based on a MAC header of the packet (Step S3). If the packet is judged as being destined for the wireless communication terminal 1, the stand-by-antenna determining unit 23 sets the receiving antenna selected by the antenna selecting unit 21 as the stand-by antenna (Step S4). Put another way, the antenna switching unit 12 does not perform antenna switching after the packet has been received.

In contrast, if the packet is not judged as being destined for the wireless communication terminal 1, the stand-by antenna remains unchanged (Step S5). Put another way, if the antenna, which has been set as a stand-by antenna when the packet has been received, and the receiving antenna selected by the antenna selecting unit 21 differ from each other after the packet has been received, the antenna switching unit 12 performs antenna switching. If the antenna, which has been set as the stand-by antenna when the packet has been received, and the receiving antenna selected by the antenna selecting unit 21 are the same, the antenna switching unit 12 does not perform antenna switching.

As discussed above, because the wireless communication terminal 1 according to the first embodiment determines whether a receiving antenna selected by the antenna selecting unit 21 is to be set as a stand-by antenna based on whether a packet obtained by demodulating a signal received via the receiving antenna selected by the antenna selecting unit 21 is destined for the wireless communication terminal 1, the wireless communication terminal 1 can select an optimum stand-by antenna with lower electric power consumption than that of conventional wireless communication terminals and less influenced by a communication condition of another wireless communication terminal.

Although the stand-by-antenna determining unit 23 has been described as determining a stand-by antenna while receiving a packet in the first embodiment, the stand-by-antenna determining unit 23 can alternatively be configured to determine a stand-by antenna after the packet has been received.

Second Embodiment

A second embodiment of the present invention is implemented by changing function of the packet-destination judging unit 22 of the wireless communication terminal 1 of the first embodiment, and the wireless communication terminal 1 and functional blocks of the first embodiment are similar to those of the second embodiment. Thus, the second embodiment will be described by referring to the wireless communication terminal 1 illustrated in FIG. 1.

In the second embodiment, the packet-destination judging unit 22 is configured to judge whether a packet obtained by demodulating a signal received by a receiving antenna selected by the antenna selecting unit 21 is destined for the wireless communication terminal 1 based on whether the packet is transmitted from the wireless communication terminal 1 within a set period of time after the signal has been demodulated into the packet by the modem unit 20.

In the IEEE 802.11a standard, it is defined that if a station has received a packet destined for the station, the station is to transmit a packet, what is called ACK, that acknowledges successful receipt of the packet after a lapse of a short period of time, what is called SIFS. Such protocol analysis of a MAC header or the like as discussed above is performed in its upper layer in many cases.

Accordingly, the packet-destination judging unit 22 includes a timer and is configured to judge that, if a request to send ACK is issued by its upper layer within a set period of time, which corresponds to SIFS having a certain margin to take delays due to standards and processing time into account, after a signal received by a receiving antenna selected by the antenna selecting unit 21 has been demodulated by the modem unit 20, the packet is destined for the wireless communication terminal 1, and if ACK has not been requested by its upper layer within the set period of time, the packet is not destined for the wireless communication terminal 1.

Alternatively, the packet-destination judging unit 22 can be configured to judge whether the packet is destined for the wireless communication terminal 1 based whether the modem unit 20 has started modulation rather than based on whether a request to send ACK has been issued by its upper layer.

Figure 4:
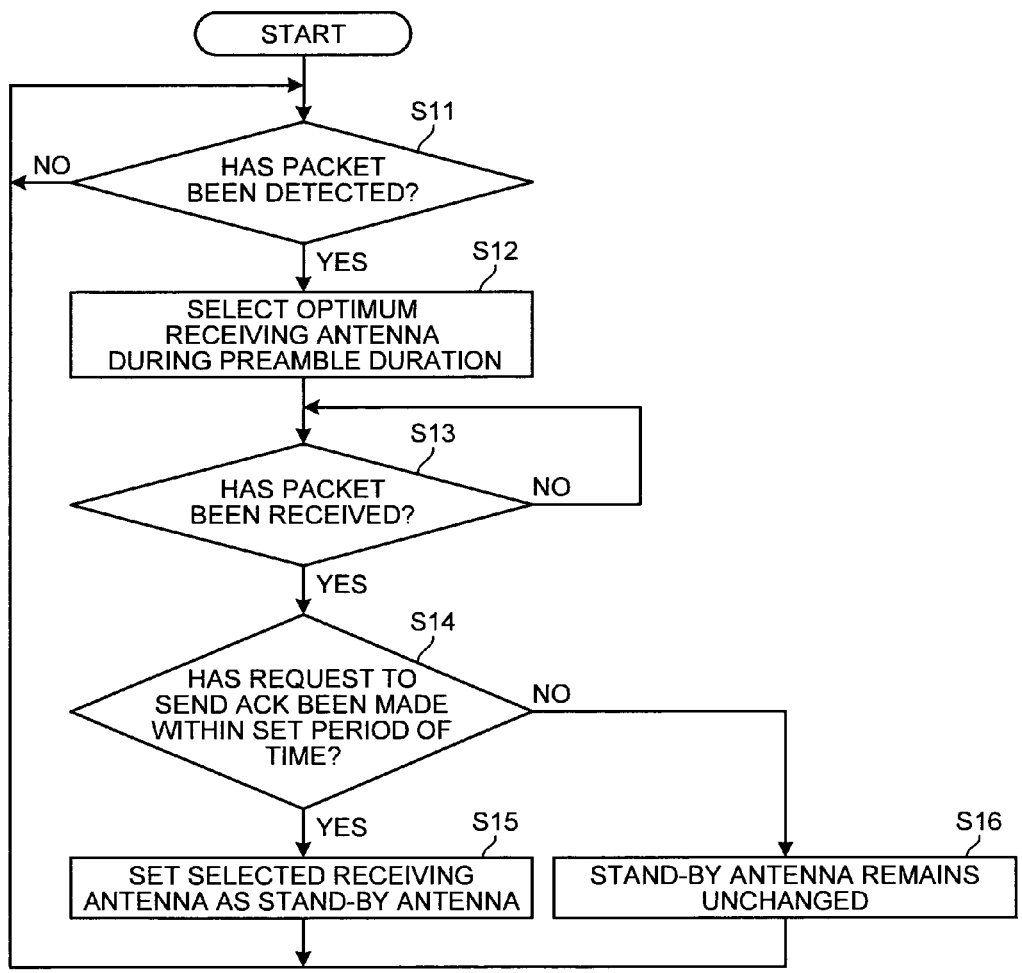
FIG. 4 is a flowchart for explaining how a wireless communication terminal according to a second embodiment of the present invention operates when receiving a packet.

How the wireless communication terminal 1 configured as discussed above operates when receiving a packet will be described with reference to FIG. 4.

When the antenna selecting unit 21 detects a packet that has been received by a stand-by antenna and demodulated by the modem unit 20 (Step S11), the antenna selecting unit 21 selects an antenna that has received a highest RSSI signal during a preamble duration of this packet as an optimum receiving antenna (Step S12).

When the packet has been received (Step S13), the packet-destination judging unit 22 judges whether a request to send ACK has been issued by its upper layer within a set period of time (Step S14).

If it is judged that a request to send ACK has been issued by its upper layer within the set period of time, the stand-by-antenna determining unit 23 sets the receiving antenna selected by the antenna selecting unit 21 as the stand-by antenna (Step S15). Put another way, the antenna switching unit 12 does not perform antenna switching after the packet has been received.

In contrast, if it is judged that a request to send ACK has not been issued by its upper layer within the set period of time, the stand-by antenna remains unchanged (Step S16). Put another way, if the antenna, which has been set as a stand-by antenna when the packet has been received, and the receiving antenna selected by the antenna selecting unit 21 differ from each other after the packet has been received, the antenna switching unit 12 performs antenna switching. If the antenna, which has been set as the stand-by antenna when the packet has been received, and the receiving antenna selected by the antenna selecting unit 21 are the same, the antenna switching unit 12 does not perform antenna switching.

As discussed above, the wireless communication terminal 1 according to the second embodiment determines whether a packet obtained by demodulating a signal received by a receiving antenna selected by the antenna selecting unit 21 is destined for the wireless communication terminal 1 based on whether a request to send ACK has been issued by its upper layer within a set period of time after the packet has been received. Accordingly, there is yielded working effects similar to those provided by the first embodiment without adding signals for interfacing with the upper layer and by using relatively simple circuit.

Third Embodiment

A third embodiment of the present invention is implemented by changing function of the packet-destination judging unit 22 of the wireless communication terminal 1 of the first embodiment, and the wireless communication terminal 1 and functional blocks of the first embodiment are similar to those of the third embodiment. Thus, the third embodiment will be described by referring to the wireless communication terminal 1 illustrated in FIG. 1.

The packet-destination judging unit 22 of the third embodiment is configured to judge whether a received packet is destined for the wireless communication terminal 1 based on whether communication mode is infrastructure mode or ad-hoc mode.

Infrastructure mode is a communication mode where wireless communications between wireless communication terminals are carried out via an access point while ad-hoc mode is a communication mode where wireless communication terminals carry out wireless communications directly with each other.

Because the wireless communication terminal 1 transmits and receives data via an access point without fail when communication mode is infrastructure mode, an antenna that can optimally receives a packet transmitted from an access point, with which the wireless communication terminal 1 is communicating, is desirably selected as the stand-by antenna.

The packet-destination judging unit 22 of the third embodiment is therefore configured to judge whether each packet is destined for the wireless communication terminal 1 when communication mode is infrastructure mode in a manner similar to that performed by the packet-destination judging unit 22 of the first embodiment.

In contrast, when communication mode is ad-hoc mode, a packet is transmitted from and received by wireless communication terminals that are communicating with each other. Accordingly, when the wireless communication terminal 1 is communicating with a plurality of wireless communication terminals in the same frequency band, the wireless communication terminal 1 cannot predict which one of the wireless communication terminals transmits a packet to be received next, and hence cannot make determination as to which antenna is to be set as a stand-by antenna.

To this end, the packet-destination judging unit 22 of the third embodiment is configured so as not to make determination as to whether each packet is destined for the wireless communication terminal 1 when communication mode is ad-hoc mode and the wireless communication terminal 1 is not communicating a single wireless communication terminal in the same frequency band.

In this case, the stand-by-antenna determining unit 23 is not provided with a result of judgment made by the packet-destination judging unit 22 and therefore does not determine a stand-by antenna. As a result, a receiving antenna selected by the antenna selecting unit 21 is set as the stand-by antenna, which eliminates the need of antenna switching which can otherwise be performed by the antenna switching unit 12.

Even when communication mode is ad-hoc mode, if the wireless communication terminal 1 is communicating with a single wireless communication terminal in the same frequency band, there is only one wireless communication terminal being the source of the packet. Accordingly, it is allowed to determine a stand-by antenna.

Accordingly, the packet-destination judging unit 22 of the third embodiment is configured to judge whether each packet is destined for the wireless communication terminal 1 when communication mode is ad-hoc mode and when the wireless communication terminal 1 is communicating with a single wireless communication terminal in the same frequency band in a manner similar to that performed by the packet-destination judging unit 22 of the first embodiment.

Meanwhile, the packet-destination judging unit 22 is informed of the number of wireless communication terminals that have established sessions in its upper layer by a processing unit of its upper layer and determines, based on the information, whether the wireless communication terminal 1 is communicating with a single wireless communication terminal in a single frequency band.

Figure 5:
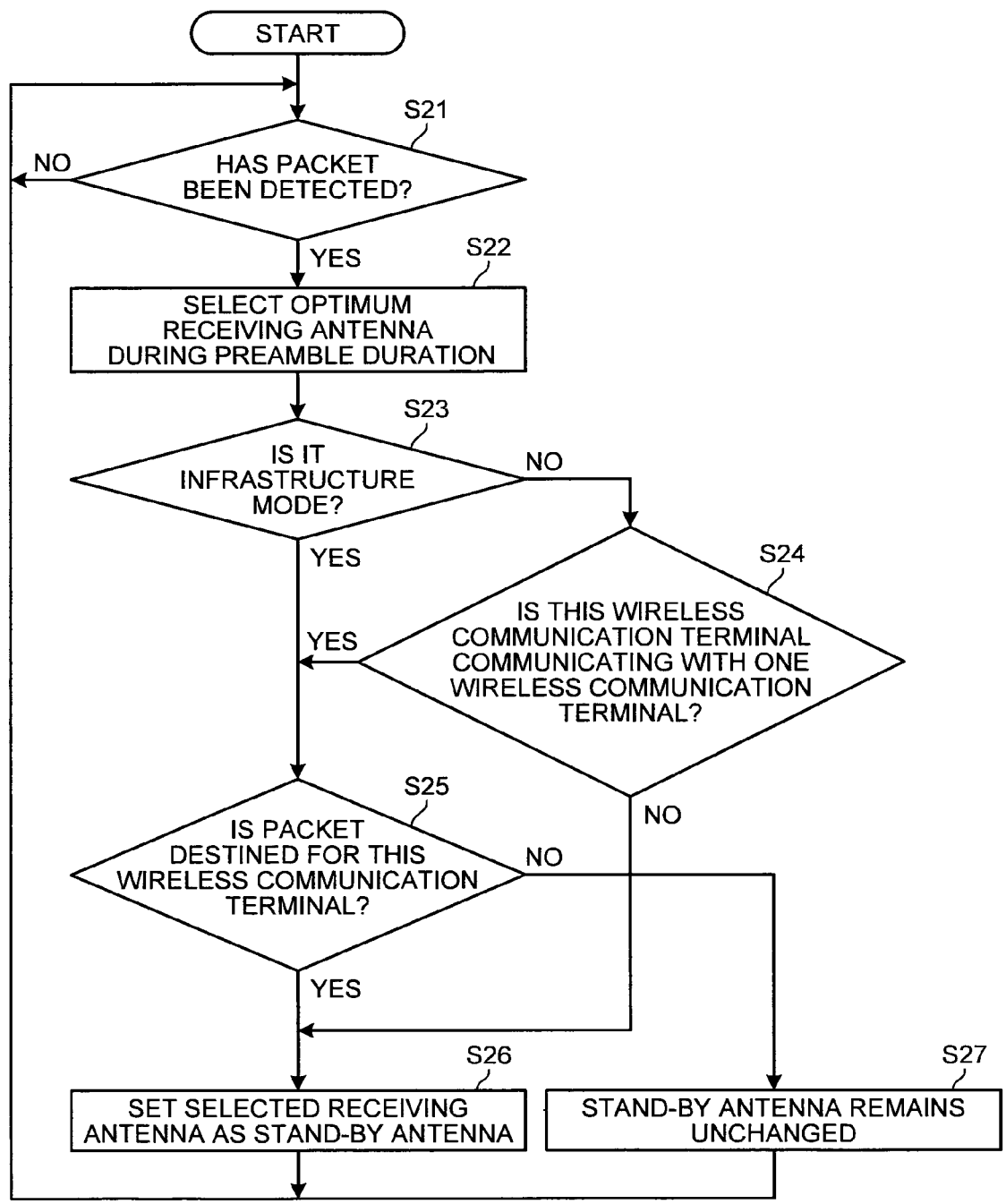
FIG. 5 is a flowchart for explaining how a wireless communication terminal according to a third embodiment of the present invention operates when receiving a packet.
Figure 6:
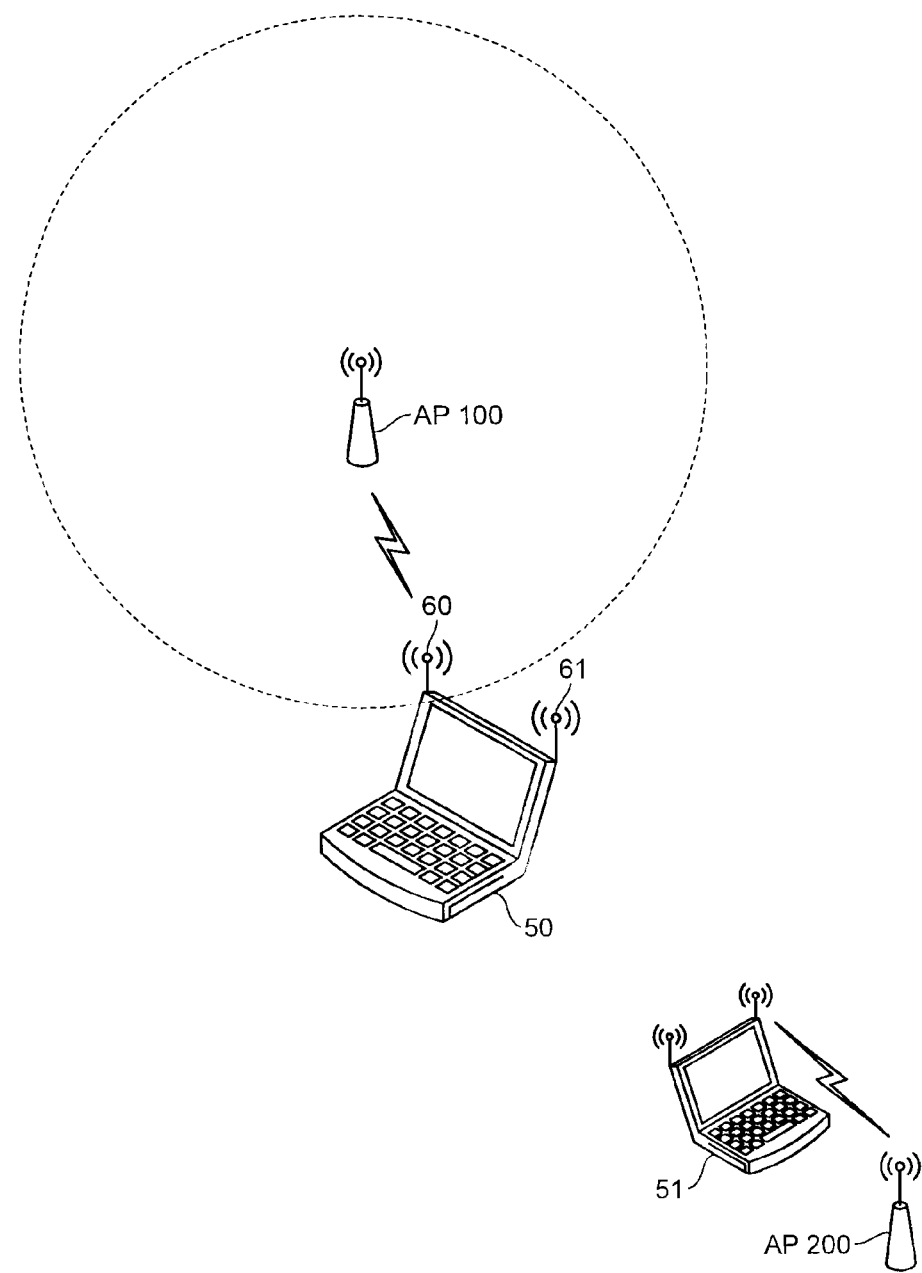
FIG. 6 is a conceptual diagram illustrating access points and wireless communication terminals in a conventional infrastructure-mode wireless LAN.
Figure 7:
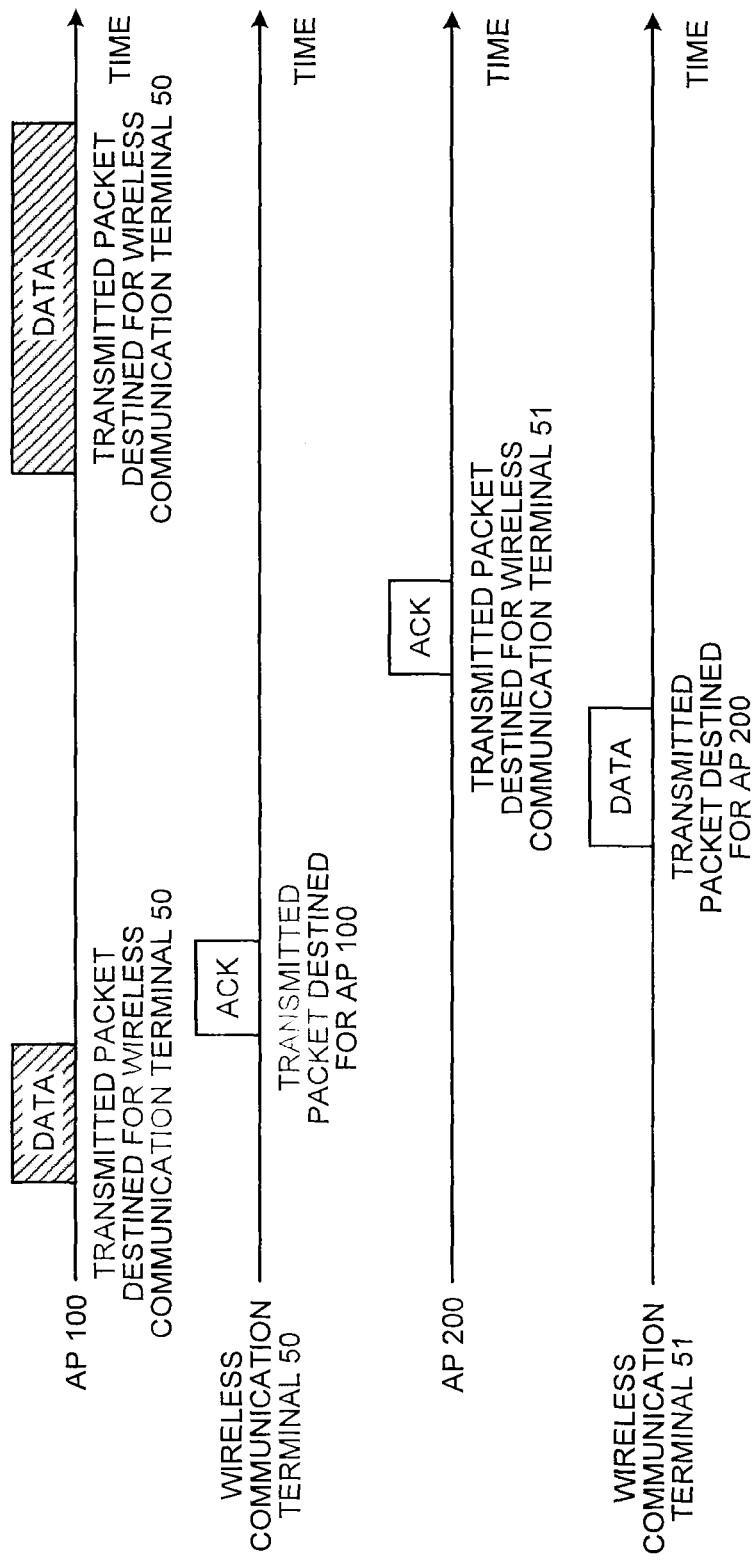
FIG. 7 is a timing diagram illustrating an example of operations performed by the access points and the wireless communication terminals illustrated in FIG. 6.

How the wireless communication terminal 1 configured as discussed above operates when receiving a packet will be described with reference to FIG. 5.

When the antenna selecting unit 21 detects a packet that has been received by a stand-by antenna and demodulated by the modem unit 20 (Step S21), the antenna selecting unit 21 selects an antenna that has received a highest RSSI signal during a preamble duration of this packet as an optimum receiving antenna (Step S22).

If communication mode is not infrastructure mode (Step S23), in other words, if communication mode is ad-hoc mode, the packet-destination judging unit 22 judges whether the wireless communication terminal 1 is communicating with a single wireless communication terminal in the same frequency band (Step S24).

If it is judged at Step S24 that the wireless communication terminal 1 is communicating with a single wireless communication terminal in the same frequency band or if it is judged at Step S23 that communication mode is infrastructure mode, the packet-destination judging unit 22 judges whether the packet is destined for the wireless communication terminal 1 while the packet is being received based on a MAC header of the packet (Step S25).

If the packet has been judged as being destined for the wireless communication terminal 1, the stand-by-antenna determining unit 23 sets the receiving antenna selected by the antenna selecting unit 21 as the stand-by antenna (Step S26). Put another way, the antenna switching unit 12 does not perform antenna switching after the packet has been received.

In contrast, if the packet has been judged as being not destined for the wireless communication terminal 1, the stand-by antenna remains unchanged (Step S27). Put another way, if the antenna, which has been set as a stand-by antenna when the packet has been received, and the receiving antenna selected by the antenna selecting unit 21 differ from each other after the packet has been received, the antenna switching unit 12 performs antenna switching. If the antenna, which has been set as a stand-by antenna when the packet has been received, and the receiving antenna selected by the antenna selecting unit 21 are the same, the antenna switching unit 12 does not perform antenna switching.

If it is judged at Step S24 that the wireless communication terminal 1 is not communicating with a single wireless communication terminal in the same frequency band, because the stand-by-antenna determining unit 23 does not determine a stand-by antenna, the receiving antenna selected by the antenna selecting unit 21 is set as a stand-by antenna (Step S26). Put another way, the antenna switching unit 12 does not perform antenna switching after the packet has been received.

As discussed above, the wireless communication terminal 1 according to the third embodiment can select, when communication mode is infrastructure mode, an optimum stand-by antenna less influenced by a communication condition of another wireless terminal than conventional wireless communication terminals are.

The wireless communication terminal 1 according to the third embodiment can select, even when communication mode is ad-hoc mode, an optimum stand-by antenna less influenced by communication condition of another wireless terminal than conventional wireless communication terminals are if the wireless communication terminal 1 is communicating with a single wireless communication terminal.

Although the stand-by-antenna determining unit 23 has been described as determining a stand-by antenna while receiving a packet in the third embodiment, the stand-by-antenna determining unit 23 can alternatively be configured to determine a stand-by antenna after the packet has been received.

In the third embodiment, an example where the packet-destination judging unit 22 of the first embodiment is configured so as to judge whether a received packet is destined for the wireless communication terminal 1 based on communication mode has been described. The packet-destination judging unit 22 of the second embodiment can also be configured to judge whether a received packet is destined for the wireless communication terminal 1 based on communication mode.

The invention claimed is:

1. A wireless communication terminal that carries out communications on a packet-by-packet basis by using a plurality of antennas with a diversity technique, the wireless communication terminal comprising:
    an antenna selecting unit that selects, for each packet, an antenna indicating a highest received signal strength from among the plurality of antennas;
    a packet-destination judging unit that judges whether a packet obtained by demodulating a signal received by the antenna indicating the highest received signal strength selected by the antenna selecting unit is destined for the wireless communication terminal; and
    a stand-by-antenna determining unit that determines, as a stand-by antenna for use in receiving a packet to be received next, the antenna indicating the highest received signal strength, when the packet destination judging unit has judged that the packet obtained by demodulating the signal received by the antenna indicating the highest received signal strength selected by the antenna selecting unit is destined for the wireless communication terminal.

2. The wireless communication terminal according to claim 1, wherein
    when the packet-destination judging unit has judged that the packet obtained by demodulating the signal received by the antenna indicating the highest received signal strength selected by the antenna selecting unit is not destined for the wireless communication terminal, the stand-by-antenna determining unit does not perform stand-by antenna switching.

3. The wireless communication terminal according to claim 1, wherein the packet-destination judging unit judges whether the packet obtained by demodulating the signal received by the receiving antenna indicating the highest received signal strength selected by the antenna selecting unit is destined for the wireless communication terminal based on whether a destination address contained in a MAC header of the packet matches an address of the wireless communication terminal.

4. The wireless communication terminal according to claim 1, wherein the packet-destination judging unit judges whether the packet obtained by demodulating the signal received by the receiving antenna indicating the highest received signal strength selected by the antenna selecting unit is destined for the wireless communication terminal based on whether the packet is transmitted from the wireless communication terminal within a set period of time after the signal has been demodulated into the packet.

5. The wireless communication terminal according to claim 1, wherein the stand-by-antenna determining unit makes the determination as to whether the packet obtained by demodulating the signal received by the antenna indicating the highest received signal strength selected by the antenna selecting unit is destined for the wireless communication terminal when communications are carried out in infrastructure mode where wireless communications are carried out between wireless communication terminals via an access point.

6. The wireless communication terminal according to claim 5, wherein even when the communications are carried out in ad-hoc mode where wireless communications are carried out directly between wireless communication terminals, if the wireless communication terminal is communicating with a single wireless communication terminal, the stand-by-antenna determining unit makes the determination as to whether the packet obtained by demodulating the signal received by the antenna indicating the highest received signal strength selected by the antenna selecting unit is destined for the wireless communication terminal.

\* \* \* \* \*

UNITED STATES PATENT AND TRADEMARK OFFICE
CERTIFICATE OF CORRECTION

Page 1 of 1

PATENT NO. : 8,724,748 B2
APPLICATION NO. : 13/319818
DATED : May 13, 2014
INVENTOR(S) : Mayuko Ueno et al.

It is certified that error appears in the above-identified patent and that said Letters Patent is hereby corrected as shown below:

On the title page, Item (86), the PCT Information is incorrect. Item (86) should read:

--(86) PCT No.:     PCT/JP2010/058145

§371 (c)(1),
      (2), (4) Date:    Nov. 10, 2011--

Signed and Sealed this
Sixteenth Day of September, 2014

Michelle K. Lee
*Deputy Director of the United States Patent and Trademark Office*